US012256280B2

(12) United States Patent
Mihály et al.

(10) Patent No.: US 12,256,280 B2
(45) Date of Patent: Mar. 18, 2025

(54) MECHANISM FOR COORDINATING SEAMLESS SERVICE CONTINUITY TO EDGE APPLICATION SERVER AT RELOCATION

(71) Applicant: Telefonaktiebolaget LM Ericsson (publ), Stockholm (SE)

(72) Inventors: Attila Mihály, Dunakeszi (HU); Maria Luisa Mas Rosique, Tres Cantos (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 231 days.

(21) Appl. No.: 18/020,647

(22) PCT Filed: Aug. 12, 2021

(86) PCT No.: PCT/IB2021/057451
§ 371 (c)(1),
(2) Date: Feb. 10, 2023

(87) PCT Pub. No.: WO2022/034539
PCT Pub. Date: Feb. 17, 2022

(65) Prior Publication Data
US 2023/0337095 A1    Oct. 19, 2023

Related U.S. Application Data

(60) Provisional application No. 63/064,689, filed on Aug. 12, 2020.

(51) Int. Cl.
*H04W 36/18* (2009.01)
*H04L 67/148* (2022.01)
(Continued)

(52) U.S. Cl.
CPC ........... *H04W 36/18* (2013.01); *H04L 67/148* (2013.01); *H04W 36/125* (2018.08); *H04W 76/22* (2018.02)

(58) Field of Classification Search
None
See application file for complete search history.

(56) References Cited

U.S. PATENT DOCUMENTS

2018/0192471 A1* 7/2018 Li ........................... H04W 4/60
2018/0317157 A1* 11/2018 Baek .................... H04W 28/16
(Continued)

OTHER PUBLICATIONS

Ericsson, "S2-2004953: KI#2, New Sol: Service Continuity at EAS relocation with PSA coexistence in session break-out scenarios," 3GPP TSG-SA/WG2 Meeting #140E, Aug. 19-Sep. 2, 2020, Electronic Meeting, 6 pages.

(Continued)

*Primary Examiner* — Alex Skripnikov
(74) *Attorney, Agent, or Firm* — Withrow & Terranova, PLLC

(57) ABSTRACT

Methods and apparatus are disclosed herein for coordinating seamless service continuity to Edge Application Server (EAS) at relocation in a cellular communications system. In some embodiments, an Application Function (AF) sends to a Policy Control Function (PCF) a steering request comprising a keepExistingPSA indication that indicates that a current user plane (UP) path to a current Data Network Access Identifier (DNAI) and to an EAS should be maintained while a new path to a new DNAI and EAS is established. The PCF generates Policy and Charging Control (PCC) rules including the keepExistingPSA indication, and provides the PCC rules to a Session Management Function (SMF). The SMF determines, based on the keepExistingPSA indication, that simultaneous connectivity over the source PSA and the target PSA is to be provided, and configures the target PSA while maintaining the UP connectivity over the source PSA to the current DNAI and to the EAS.

21 Claims, 9 Drawing Sheets

(51) Int. Cl.
  *H04W 36/12* (2009.01)
  *H04W 76/22* (2018.01)

(56) References Cited

U.S. PATENT DOCUMENTS

| | | | | |
|---|---|---|---|---|
| 2019/0357301 | A1* | 11/2019 | Li | H04L 45/74 |
| 2021/0314266 | A1* | 10/2021 | Li | H04L 47/2441 |
| 2022/0086719 | A1* | 3/2022 | Devlic | H04L 41/5051 |
| 2022/0109633 | A1* | 4/2022 | Li | H04W 48/08 |
| 2022/0210700 | A1* | 6/2022 | Wu | H04L 67/51 |
| 2023/0096469 | A1* | 3/2023 | John | H04W 36/12 |
| | | | | 370/392 |

OTHER PUBLICATIONS

Samsung, "S2-2004419: KI#2, New Sol: IP preserving PSA relocation with two simultaneous PDU Sessions," 3GPP SA WG2 Meeting #139E, Jun. 1-12, 2020, Electronic Meeting, 6 pages.

ZTE, et al., "S2-2004413: KI#2, New Sol: Reducing packet loss during EAS relocation," 3GPP TSG-SA/WG2 Meeting #139E, Jun. 1-12, 2020, Electronic Meeting, 5 pages.

Intention to Grant for European Patent Application No. 21762800.7, mailed Nov. 6, 2023, 8 pages.

Decision to Grant for Japanese Patent Application No. 2022-572432, mailed Nov. 17, 2023, 6 pages.

Author Unknown, "Technical Specification Group Services and System Aspects; Architecture enhancements to facilitate communications with packet data networks and applications (Release 16)," Technical Specification 23.682, Version 16.7.0, Jul. 2020, 3GPP Organizational Partners, 134 pages.

Examination Report for Indian Patent Application No. 202317002038, mailed Mar. 21, 2024, 6 pages.

Author Unknown, "Technical Specification Group Services and System Aspects; Study on enhancement of support for Edge Computing in 5G Core network (5GS) (Release 17)," Technical Report 23.748, Version 0.4.0, Jun. 2020, 3GPP Organizational Partners, 189 pages.

Author Unknown, "Technical Specification Group Services and System Aspects; Study on enhancement of support for Edge Computing in 5G Core network (5GS) (Release 17)," Technical Report 23.748, Version 0.5.0, 3GPP Organizational Partners, 232 pages, Date: Sep. 2020.

Author Unknown, "Technical Specification Group Services and System Aspects; System architecture for the 5G System (5GS); Stage 2 (Release 16)," Technical Specification 23.501, Version 16.3.0, Dec. 2019, 3GPP Organizational Partners, 417 pages.

Author Unknown, "Technical Specification Group Services and System Aspects; System architecture for the 5G System (5GS); Stage 2 (Release 16)," Technical Specification 23.501, Version 16.5.0, Jul. 2020, 3GPP Organizational Partners, 441 pages.

Author Unknown, "Technical Specification Group Services and System Aspects; Procedures for the 5G System; Stage 2 (Release 15)," Technical Specification 23.502, Version 15.1.0, Mar. 2018, 3GPP Organizational Partners, 285 pages.

Author Unknown, "Technical Specification Group Services and System Aspects; Procedures for the 5G System (5GS); Stage 2 (Release 16)," Technical Specification 23.502, Draft, Version 16.4.0, May 2020, 3GPP Organizational Partners, 607 pages.

Author Unknown, "Technical Specification Group Services and System Aspects; Procedures for the 5G System (5GS); Stage 2 (Release 16)," Technical Specification 23.502, Version 16.5.0, Jul. 2020, 3GPP Organizational Partners, 594 pages.

Ericsson, "S2-200xxxx: KI#2, New sol: Service Continuity at EAS relocation with PSA coexistence in session break-out scenarios," 3GPP TSG-SA/WG2 Meeting #140E, Aug. 2020, Electronic Meeting, 6 pages.

International Search Report and Written Opinion for International Patent Application No. PCT/IB2021/057451, mailed Oct. 27, 2021, 19 pages.

* cited by examiner

MECHANISM FOR COORDINATING SEAMLESS SERVICE CONTINUITY TO EDGE APPLICATION SERVER AT RELOCATION

RELATED APPLICATIONS

This application is a 35 U.S.C. § 371 national phase filing of International Application No. PCT/IB2021/057451, filed Aug. 12, 2021, which claims the benefit of provisional patent application Ser. No. 63/064,689, filed Aug. 12, 2020, the disclosures of which are hereby incorporated herein by reference in their entireties.

TECHNICAL FIELD

The present disclosure relates to maintaining service continuity at Edge Application Server (EAS) relocation in a cellular communications system.

BACKGROUND

The current disclosure relates to functionality to support Edge Computing (EC) in the Third Generation Partnership Project (3GPP). The Fifth Generation (5G) network architecture is defined by 3GPP Technical Specification (TS) 23.501. The role of the Network Functions are defined as follows:
  The Session Management Function (SMF) is responsible for session establishment, modification, and release (including selection and control of User Plan Function (UPF) entities); maintaining the topology of the involved Packet Data Unit (PDU) Session Anchor (PSA) UPFs; and establishing and releasing the tunnel between an Access Network (AN) and a UPF and between UPFs. The SMF also configures traffic forwarding at a UPF. The SMF interacts with the UPF over the N4 Reference point using Packet Forwarding Control Protocol (PFCP) procedures.
  The User Plane Function (UPF) handles the user data traffic. Among other functionality, the UPF provides an external PDU Session point of interconnection to a Data Network (DN) (e.g., a PSA), and performs packet routing and forwarding (e.g., by supporting an Uplink Classifier (UL CL) to route traffic flows to an instance of a DN, and/or supporting a branching point to support a multi-homed PDU Session).
  The Policy Control Function (PCF) supports a unified policy framework to govern the network behavior. Specifically, the PCF provides Policy and Charging Control (PCC) rules to the Policy and Charging Enforcement Function (PCEF) (i.e., the SMF/UPF that enforces policy and charging decisions according to provisioned PCC rules).
  The Network Exposure Function (NEF) supports different functionality, and specifically in the context of this disclosure, the NEF acts as the entry point into an operator's network, enabling an external Application Function (AF) (such as a content provider) to interact with the 3GPP core network through NEF.
  The AF sends requests to influence SMF routing decisions for traffic constituting a PDU session. The AF requests may influence UPF selection or re-selection, and may allow routing of user traffic via a local access to a DN (e.g., identified by a Data Network Access Identifier, or DNAI). The AF may communicate directly with the PCF in the Service-Based Architecture (SBA) domain or indirectly through the NEF (i.e., using an Application Programming Interface (API) to the NEF that conveys the AF communication to the PCF).

As stated in section 5.13 of the 3GPP TS 23.501, EC enables operator and third-party services to be hosted close to the user equipment (UE) access point of attachment, to achieve an efficient service delivery through the reduced end-to-end latency and load on the transport network. The 5G core network selects a UPF close to the UE and executes the traffic steering from the UPF to the local DN via an N6 interface. Section 5.13. of TS 23.501 also defines a number of enablers that alone or in combination support EC, including the following:
  User plane selection or re-selection: the 5G Core Network selects or re-selects a UPF to route the user traffic to the local DN, as described in section 6.3.3 of TS 23.501;
  Local Routing and Traffic Steering: the 5G Core Network selects the traffic to be routed to the applications in the local DN, which may include the use of a single PDU Session with multiple PDU Session Anchor(s) (UL CL/IP v6 multi-homing) as described in section 5.6.4 of TS 23.501;
  Session and service continuity to enable UE and application mobility as described in section 5.6.9 of TS 23.501; and
  An Application Function may influence UPF selection and re-selection and traffic routing via PCF or NEF, as described in greater detail below.

An AF may send requests to influence SMF routing decisions for traffic of a PDU Session. The AF requests may influence UPF selection or re-selection, and may allow the routing of user traffic to a local access to a DN. The location of the local access to the DN is identified with the DNAI. The AF may issue requests on behalf of applications not owned by the Public Land Mobile Network (PLMN) serving the UE. If the operator does not allow an AF to access the network directly, the AF uses the NEF to interact with the 5G core (5GC).

The AF may be in charge of the selection or re-selection and/or the relocation of the applications within the local DN. Such functionality is not part of 5GC, but rather is part of the application layer. For this purpose, the AF may request to be notified about events related with PDU sessions, like changes of the PDU session anchor. The AF requests can be sent to the PCF (for specific on-going PDU sessions of individual UEs, if an AF is allowed to interact directly with the 5GC NFs), or via the NEF. AF requests that target existing or future PDU Sessions of multiple UEs or of any UE are sent via the NEF and may target multiple PCFs. The PCFs transform the AF requests into policies that apply to PDU Sessions.

When the AF has subscribed to UP path management event notifications from SMFs (including notifications on how to reach a Generic Public Subscription Identifier (GPSI) over N6), such notifications are sent by an SMF either directly to the AF or via a NEF (without involving the PCF). 3GPP TS 23.502 describes in section 4.6.3 the related procedures and the role of the NFs involved.

The AF requests may contain, in part, the following information:
  Traffic Description (mandatory): Defines the target traffic to be influenced, represented by the combination of Data Network Name (DNN) and optionally Single Network Slice Selection Assistance Information (S-NSSAI), and application identifier or traffic filtering information;

Potential Locations of Applications (conditional—may be absent only if the request is for subscription to notifications): Indicates potential locations of applications, represented by a list of DNAI(s); and Information on AF subscription to corresponding SMF events (optional): Indicates whether the AF subscribes to change of UP path of the PDU Session and the parameters of this subscription.

Note that only items relevant to this disclosure are listed above. A more complete listing can be found in Table 6.5.7-1 in TS 23.501).

The relevant scenario for this disclosure relates to providing session and service continuity to enable UE and application mobility. These methods could imply UP path management solutions in 5GC for some existing PDU sessions (e.g., changing the existing PSA or adding a new PSA). The detailed functionality for the current 5GC Release 16 is described in section 4.3.5 of TS 23.502.

There is a possibility to enable runtime coordination between the 5GC and the AF during the above processes. To support this functionality, the AF may include in its request an "AF acknowledgement to be expected" indication. Based on this indication, when the SMF sends an Early Notification about the UP path changes to be applied, including the corresponding source and target DNAI, the SMF does not proceed until it receives a positive response from the AF. This enables the AF to take any actions needed to preserve service continuity on the new path. Similarly, the SMF may send a Late Notification to the AF to inform it about the DNAI change. This notification can be used by the AF, for example, to trigger mechanisms in the source local DN to redirect the ongoing traffic sessions towards an application in the target local DN. The SMF may not activate the UP path towards the new DNAI until it receives a positive AF response.

SUMMARY

Methods and apparatus are disclosed herein for coordinating seamless service continuity to Edge Application Server (EAS) at relocation in a cellular communications system. Embodiments of a method for coordinating seamless service continuity to EAS at relocation in a cellular communications system are disclosed herein. In some embodiments, the method comprises, at an Application Function (AF), sending, to a Policy Control Function (PCF) a steering request comprising application steering information that comprises a keepExistingPSA indication that indicates that a current user plane (UP) path to a current Data Network Access Identifier (DNAI) and to an EAS should be maintained while a new path to a new DNAI and EAS is established. The method further comprises, at the PCF, receiving the steering request from the AF, generating Policy and Charging Control (PCC) rules based on the steering request, wherein the PCC rules comprise the application steering information comprising the keepExistingPSA indication. The method also comprises providing the PCC rules to a Session Management Function (SMF). The method additionally comprises, at the SMF, receiving the PCC rules from the PCF. The method further comprises determining that a change of Protocol Data Unit (PDU) session anchor (PSA) for a PDU session, is to be performed from the source PSA to a target PSA. The method also comprises determining, based on the keepExistingPSA indication, that simultaneous connectivity over the source PSA and the target PSA is to be provided. The method additionally comprises configuring the target PSA while maintaining the UP connectivity over the source PSA to the current DNAI and to the EAS.

Embodiments of method for coordinating seamless service continuity to EAS at relocation in a cellular communications system are also disclosed herein. In some embodiments, the method comprises sending, by an AF to a PCF a steering request comprising application steering information that comprises a keepExistingPSA indication that indicates that a current UP path to a current DNAI and to an EAS should be maintained while a new path to a new DNAI and EAS is established. Some embodiments disclosed herein provide that the application steering information further comprises a KeepExistingPSATimer indication that indicates how long to keep a former PDU session anchor, PSA. According to some embodiments disclosed herein, the application steering information further comprises an indication of a minimum time interval to be considered for inactivity of a Source branching point, BP/uplink classifier, UL CL.

In some embodiments disclosed herein, the application steering information further comprises an indication of a minimum time interval to be considered for inactivity of a Source User Plane Function (UPF). Some embodiments disclosed herein provide that the method further comprises determining that an EAS change requiring a change of DNAI is to be performed, and invoking a Nnef_TrafficInfluence service, including the application steering information. According to some embodiments disclosed herein, the method further comprises determining that an EAS change requiring a change of DNAI is to be performed, and sending one of an Npcf_PolicyAuthorization Create service request comprising the application steering information and an Npcf_PolicyAuthorization Update service request comprising the application steering information.

Embodiments of a network node for implementing an AF, where the AF is enabled to coordinate seamless service continuity to EAS relocation at relocation in a cellular communications system, are also disclosed herein. In some embodiments, the network node is adapted to send, to a PCF a steering request comprising application steering information that comprises a keepExistingPSA indication that indicates that a current UP path to a current DNAI and to an EAS should be maintained while a new path to a new DNAI and EAS is established. Some embodiments disclosed herein may further provide that the network node is further adapted to perform the steps of any of the above-disclosed methods attributed to the network node.

Embodiments of a network node for implementing an AF, where the AF is enabled to seamless service continuity to EAS at relocation in a cellular communications system are also disclosed herein. In some embodiments, the network node comprises a network interface, and processing circuitry associated with the network interface. The processing circuitry is configured to send, to a PCF a steering request comprising application steering information that comprises a keepExistingPSA indication that indicates that a current UP path to a current DNAI and to an EAS should be maintained while a new path to a new DNAI and EAS is established. Some embodiments disclosed herein further provide that the processing circuitry is further configured to perform the steps of any of the above-disclosed methods attributed to the network node.

Embodiments of a method performed in a PCF in a core network of a cellular communications system to coordinate seamless service continuity to EAS at relocation are also disclosed herein. In some embodiments, the method comprises receiving, from an AF, a steering request that comprises application steering information that comprises a keepExistingPSA indication that indicates that a current UP path to a current DNAI and to an EAS should be maintained while a new path to a new DNAI and EAS is established. The method further comprises generating PCC rules based on the steering request, wherein the PCC rules comprise the application steering information. The method also comprises providing the PCC rules to an SMF. Some embodiments disclosed herein may further provide that the steering request targets a new PDU session, and generating the PCC rules comprises generating the PCC rules during establishment of the new PDU session. In some embodiments disclosed herein, the steering request targets an ongoing PDU session, and generating the PCC rules comprises generating the PCC rules during modification of the ongoing PDU session.

Embodiments of a network node for implementing a PCF for a core network of a cellular communications system where the PCF is enabled to coordinate seamless service continuity to EAS at relocation are also disclosed herein. In some embodiments, the network node is adapted to receive, from an AF a steering request that comprises application steering information that comprises a keepExistingPSA indication that indicates that a current UP path to a current DNAI and to an EAS should be maintained while a new path to a new DNAI and EAS is established. The network node is further adapted to generate PCC rules based on the steering request, wherein the PCC rules comprise the application steering information. The network node is also adapted to provide the PCC rules to an SMF. Some embodiments disclosed herein may further provide that the network node is further adapted to perform the steps of any of the above-disclosed methods attributed to the network node.

Embodiments of a network node for implementing a PCF for a core network of a cellular communications system where the PCF is enabled to coordinate seamless service continuity to EAS at relocation are also disclosed herein. In some embodiments, the network node comprises a network interface, and processing circuitry associated with the network interface. The processing circuitry is configured to receive, from an AF a steering request that comprises application steering information that comprises a keepExistingPSA indication that indicates that a current UP path to a current DNAI and to an EAS should be maintained while a new path to a new DNAI and EAS is established. The processing circuitry is further configured to generate PCC rules based on the steering request, wherein the PCC rules comprise the application steering information. The processing circuitry if also configured to provide the PCC rules to an SMF. Some embodiments disclosed herein further provide that the processing circuitry is further configured to perform the steps of any of the above-disclosed methods attributed to the network node.

Embodiments of a method performed in an SMF in a core network of a cellular communications system to coordinate seamless service continuity to EAS at relocation are also disclosed herein. In some embodiments, the method comprises receiving PCC rules from a PCF wherein the PCC rules comprise application steering information that comprises a keepExistingPSA indication that indicates that a current UP path to a current DNAI and to an EAS should be maintained while a new path to a new DNAI and EAS is established. The method further comprises determining that a change of PSA for a PDU session, is to be performed from a source PSA to a target PSA. The method also comprises determining, based on the keepExistingPSA indication, that simultaneous connectivity over the source PSA and the target PSA is to be provided. The method additionally comprises configuring the target PSA while maintaining the UP connectivity over the source PSA to the current DNAI and to the EAS. Some embodiments disclosed herein further provide that the application steering information further comprises a KeepExistingPSATimer indication that indicates how long to keep a former PSA and the method further comprises starting a timer for a time interval based on the indication of how long to keep the former PSA, and maintaining a Source BP/UL CL and a Source UPF until expiration of the timer. In some embodiments disclosed herein, the application steering information further comprises an indication of a minimum time interval to be considered for inactivity of a Source BP/UL CL and a Source UPF, and the method further comprises starting an inactivity timer for traffic through the Source BP/UL CL and the Source UPF, wherein the inactivity timer has a value equal to or larger than the minimum time interval, and removing the Source BP/UL CL and the Source UPF after a period of inactivity specified by the inactivity timer.

Embodiments of a network node for implementing an SMF for a core network of a cellular communications system where the SMF is enabled to coordinate seamless service continuity at EAS relocation are also disclosed herein. In some embodiments, the network node is adapted to receive PCC rules from a PCF wherein the PCC rules comprise application steering information that comprises a keepExistingPSA indication that indicates that a current UP path to a current DNAI and to an EAS should be maintained while a new path to a new DNAI and EAS is established. The network node is further adapted to determine that a change of PSA for a PDU session, is to be performed from a source PSA to a target PSA. The network node is also adapted to determine, based on the keepExistingPSA indication, that simultaneous connectivity over the source PSA and the target PSA is to be provided. The network node is additionally adapted to configure the target PSA while maintaining the UP connectivity over the source PSA to the current DNAI and to the EAS. Some embodiments disclosed herein may further provide that the network node is further adapted to perform the steps of any of the above-disclosed methods attributed to the network node.

Embodiments of a network node for implementing an SMF for a core network of a cellular communications system where the SMF is enabled to coordinate seamless service continuity at EAS relocation are also disclosed herein. In some embodiments, the network node comprises a network interface, and processing circuitry associated with the network interface. The processing circuitry is configured to receive PCC rules from a PCF wherein the PCC rules comprise application steering information that comprises a keepExistingPSA indication that indicates that a current UP path to a current DNAI and to an EAS should be maintained while a new path to a new DNAI and EAS is established. The processing circuitry is further configured to determine that a change of PSA for a PDU session, is to be performed from a source PSA to a target PSA. The processing circuitry is also configured to determine, based on the keepExistingPSA indication, that simultaneous connectivity over the source PSA and the target PSA is to be provided. The processing circuitry is additionally configured to configure the target PSA while maintaining the UP connectivity over the source PSA to the current DNAI and to the EAS. Some embodiments disclosed herein further provide that the processing circuitry is further configured to perform the steps of any of the above-disclosed methods attributed to the network node.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
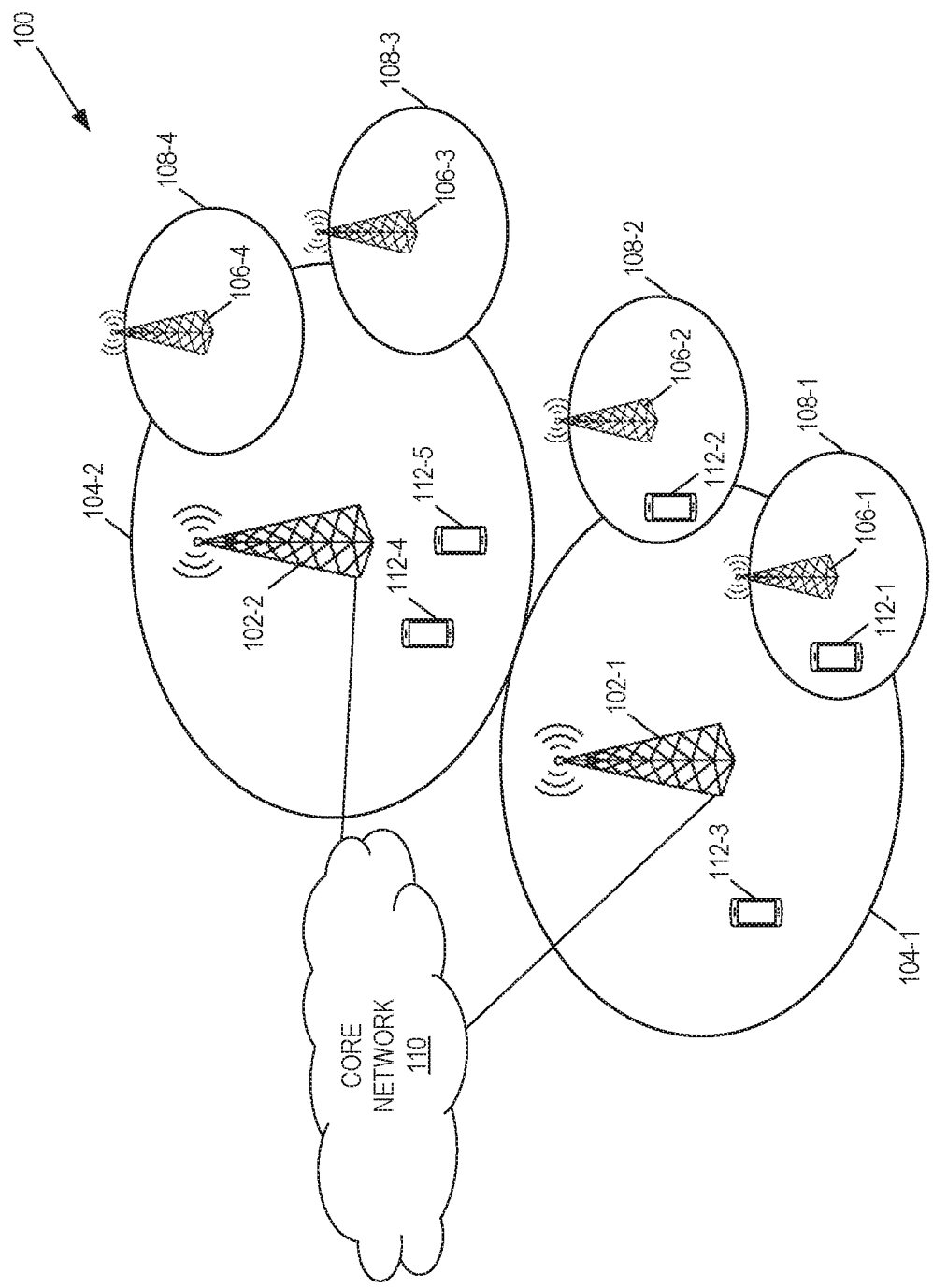
FIG. 1 illustrates one example of a cellular communications system according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

There currently exist certain challenge(s) with existing approaches. Section 4.3.5.7 of TS 23.502 describes a procedure for "Simultaneous change of Branching Point or UL CL and additional PSA for a PDU Session." In the description of this procedure, step 10 states as shown below in Table 1:

TABLE 1

10. When session continuity upon UL CL relocation is used, detection of no active traffic over the N9 forwarding tunnel is performed during a preconfigured time interval in order to release the N9 forwarding tunnel. The detection can be done by either Source UL CL or Target UL CL, either of which notifies the SMF.

NOTE 7:
It is up to network configuration whether the detection of no active traffic is performed by the Source UL CL or the Target UL CL. As an alternative to the detection of no active traffic, the AF can send an explicit notification to the SMF when traffic to/from this UE ceases to exist, leading the SMF to release the Source UL CL and the Source UPF (PSA2)."

However, there is no indication in the standard related to how the SMF knows whether session continuity upon UL CL relocation is used. There could be an internal policy setting in the 5GC to determine this, but there is no possibility from the AF side to dynamically control if session continuity is to be used (e.g., for a given application or application session). Thus, it would be desirable if the AF could control whether session continuity upon UL CL relocation should be used for a specific PDU session.

Also, as mentioned in Note 7 of the referenced text, the AF can send an explicit notification to the SMF to release the Source UL CL and the Source local PSA, but it is not possible for the AF to indicate in advance a time interval for how long the old and new UP paths should coexist.

Accordingly, certain aspects of the present disclosure and their embodiments may provide solutions to the aforementioned or other challenges. There are, proposed herein, various embodiments which address one or more of the issues disclosed herein. Systems and methods for coordinate seamless service continuity to EAS at relocation are proposed that provide solutions to the aforementioned or other challenges.

In some embodiments, an edge relocation related preference is conveyed by the AF sent with the AF influence on traffic routing. This information would include an indication of whether and for how long session continuity upon UL CL relocation should be used in the cases when simultaneous change of UL CL and PSA is applied.

Certain embodiments may provide one or more of the following technical advantage(s). In particular, the solution allows 5GC to make smarter decisions that adapt better to the actual application needs by further enhancing AF control on traffic routing in a way that enables service continuity for the EC services.

Before discussing methods and apparatus for re-anchoring with SMF re-selection in greater detail, exemplary cellular communications systems in which some embodiments of the present disclosure may be implemented are first discussed. In this regard, the following terms are defined:

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 102-1 and 102-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
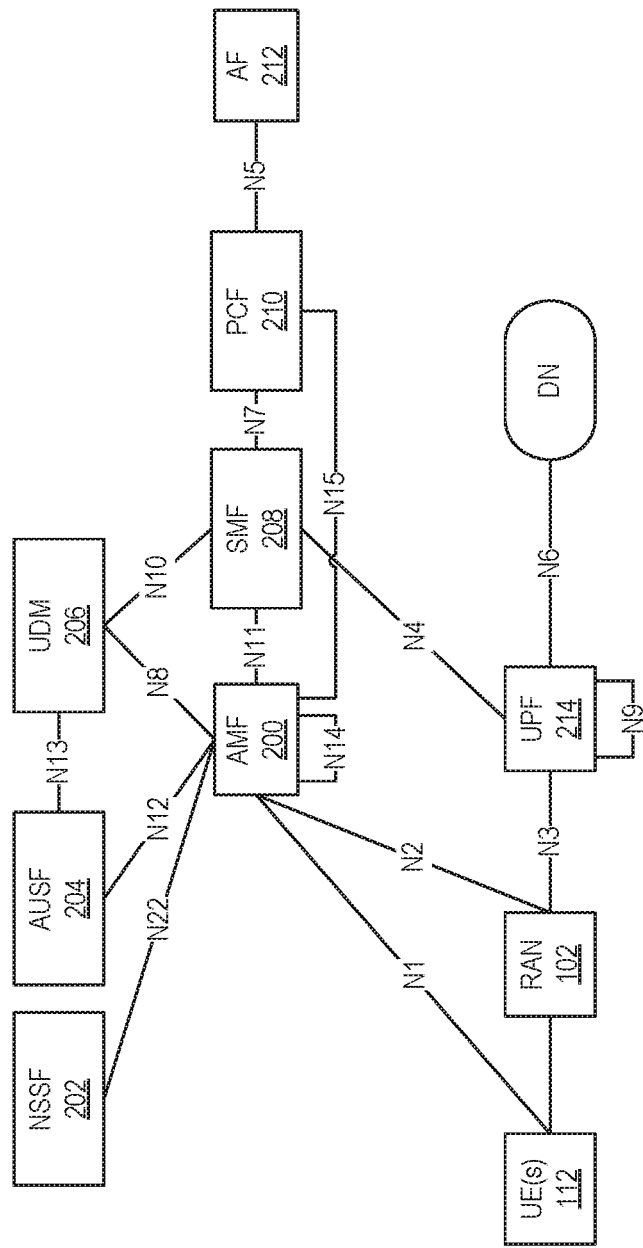
FIGS. 2 and 3 illustrate example embodiments in which the cellular communication system of FIG. 3 is a Fifth Generation (5G) System (5GS)

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side, the 5G network architecture shown in FIG. 2 comprises a plurality of UEs 112 connected to either a RAN 102 or an Access Network (AN) as well as an AMF 200. Typically, the RAN 102 comprises base stations, e.g., such as eNBs or gNBs or similar. Seen from the core network side, the 5GC NFs shown in FIG. 2 include an NSSF 202, an AUSF 204, a UDM 206, the AMF 200, an SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the RAN 102 and AMF 200 and between the RAN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and the SMF 208, respectively. N12 is required for the AMF 200 to perform authentication of the UE 112. N8 and N10 are defined because the subscription data of the UE 112 is required for the AMF 200 and the SMF 208.

The 5GC network aims at separating user plane (UP) and control plane (CP). The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
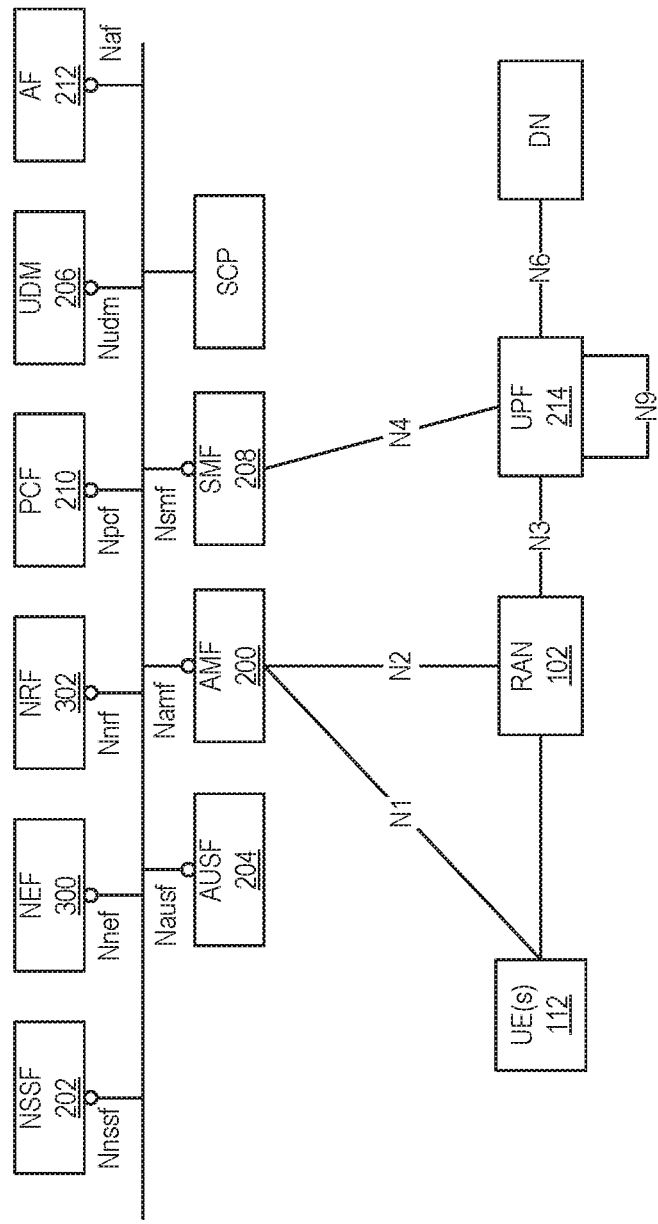

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that an NF provides to other authorized NFs can be exposed to the authorized NFs through the service-based interface. In FIG. 3, the service based interfaces are indicated by the letter "N" followed by the name of the NF, e.g., Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management, and may allocate Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support QoS. Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar. An NF may be implemented either as a network element on a dedicated hardware, as a software instance running on a dedicated hardware, or as a virtualized function instantiated on an appropriate platform, e.g., a cloud infrastructure.

As noted above, systems and methods for coordinating seamless service continuity to EAS at relocation are disclosed herein. The solution relates to the AF influence on traffic routing, and thus impacts two (2) of the service operations:

When the AF request is targeting an individual UE address that needs to be received by the relevant PCF, the indication should be sent in the Npcf_PolicyAuthorization Create/Update service request. Either the AF sends the AF request directly to the PCF and then invokes Npcf_PolicyAuthorization directly, or Npcf_PolicyAuthorization is invoked by the NEF (see section 4.3.6.4 of TS 23.502).

When the AF request is not identified by a UE Internet Protocol (IP) address, then the indication is sent in a Nnef_TrafficInfluence_Create or Update request to the NEF (see section 4.3.6.2 of TS 23.502), that is stored in UDR, and PCF will receive it when needed.

There are two potential triggers for application relocation that could imply sending the above messages:

The application server change is triggered by the 5GC wanting to change the local PSA of the UE. This could happen because of, for example, UE mobility. This change of UP path can be notified to the application server side via AF by user plane management notification of PSA relocation/DNAI change.

The application server change is initiated from the application side (e.g., for load rebalancing reasons due to the serving Edge Application Server becoming congested). The role of the 5GC in this case is to ensure connectivity to the New EAS by setting up a proper UL CL/BP and Local PSA.

Example procedures for both scenarios are shown in turn below.

Figure 4A:
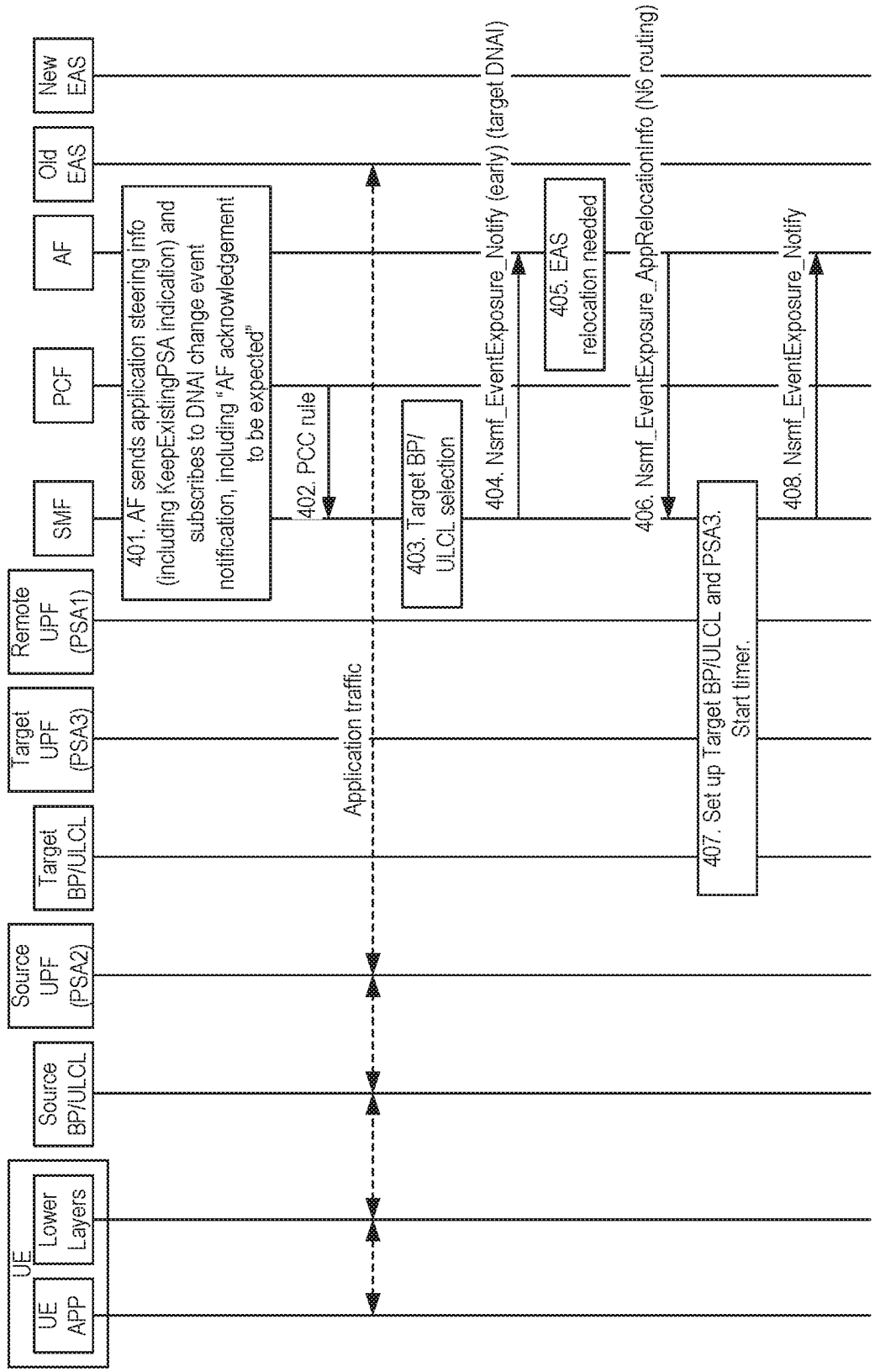
FIGS. 4A and 4B illustrate exemplary communication flows and operations for a 5G Core (5GC)-triggered Edge Application Server (EAS) relocation, according to some embodiments disclosed herein.
Figure 4B:
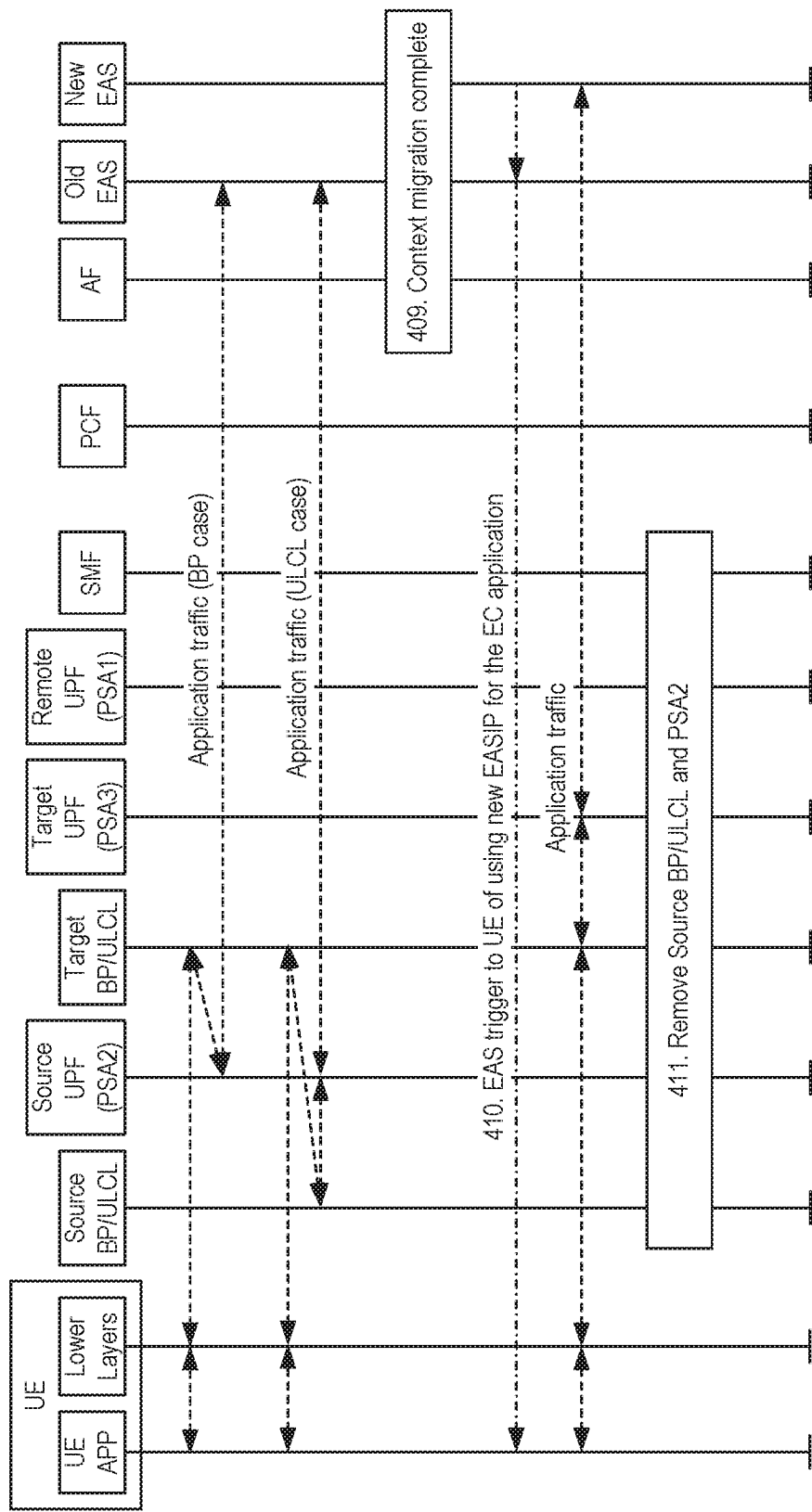

FIGS. 4A and 4B show operations for a 5GC-triggered EAS relocation. The procedure below assumes that the runtime coordination between the 5GC and the application (AF) is enabled. The coordination provides notification and control of old and new UL CL/BP and Local PSA. A description of each step in the procedure illustrated in FIGS. 4A and 4B is provided below.

At step 401 of FIG. 4A, before or during the edge application connection, the AF may send a request to influence traffic routing for Sessions or an individual UE address (see sections 4.3.6.2 and 4.6.3.4 of TS 23.502). That request provides Traffic Filters, DNA's, and N6 traffic routing info. The application steering information could be provided by other means (e.g., as part of a service-level agreement (SLA) and as needed; see, e.g., Solution #3 in TR 23.748). In addition, subscription to DNAI change notification is sent to the Core network including the domain name of the application and the 'AF acknowledgement to be expected' indication. This procedure is similar to steps 1-4 that are defined in section 4.3.6.2 of TS 23.502.

In addition, the AF also includes in the steering request a new keepExistingPSA indication, indicating that, in case of UP path changes to the specified DNAI(s), the existing UP path should also be temporarily kept (i.e., session continuity upon UL CL relocation is to be used) for the UE during and after the setup of a new UP path. The AF in some embodiments may also provide input with respect to how long to keep the former PSA. According to some embodiments, the AF could indicate the minimum time interval to be considered for inactivity of former path using a KeepExistingPSATimer indication.

At step 402, the PCF generates PCC rules based on the AF request and provides the PCC rules to the SMF. The PCC rules include the keepExistingPSA indication and additional information as well. This step may happen during establishment of the PDU Session or during modification of the PDU Session, depending on whether the request was targeting an ongoing PDU session or not. It is assumed that the edge application connection is set up using one of the mechanisms proposed for EAS discovery and selection (e.g., Solution #3 in TR 23.748). Originally, the traffic flows towards the Old EAS through the Source BP/UL CL and Source UPF (PSA2) that are set up based on the PCC rules for this application.

At step 403, the SMF determines that relocation of Source BP/UL CL and Source UPF (PSA2) is needed. The relocation may be triggered by UE mobility.

At step 404, based on the AF subscription, the SMF sends an early notification to the AF, including the corresponding source and target DNAI. The SMF does not proceed until it receives a positive response from the AF, as described in section 5.6.7 of TS 23.501.

At step 405, based on a target DNAI of the notification received in step 404, the AF (or some other control logic triggered by the AF) determines that application server relocation is needed, and it determines a new Edge AS.

At step 406, the AF sends an Nsmf_EventExposure_AppRelocationInfo service operation to the SMF for this UE, as described in section 4.3.6.3 of TS 23.502. Note that at this point the Old EAS still handles the edge application connection (but the instantiation of the New EAS and the context migration could have been started). In this message, the AF acknowledges the notification and may provide N6 traffic routing information associated to the target DNAI.

At step 407, the SMF determines that, for this session, it needs to perform a simultaneous change of BP or UL CL and additional PSA for a PDU Session (as described in section 4.3.5.7 of TS 23.502). The SMF infers from the keepExistingPSA indication in the PCC rule that session continuity upon UL CL relocation is to be used, and sets up the Target BP/UL CL and Target UPF (PSA2) determined in step 403 and configures the filters based on the steering information already available (see step 401). To support session continuity during UL CL relocation and EAS migration, a temporary N9 forwarding tunnel is established between the Source UL CL and Target UL CL. This is described in section 5.6.4.2. of TS 23.501. Current Source BP/UL CL and Source UPF (PSA2) are to be kept for some time, and a timer is started with a value that considers the information received from the AF.

In some embodiments, the SMF could set inactivity timers for the traffic through the Source BP/UL CL and Source UPF (PSA2) to remove them after a period of inactivity. The inactivity timer has a value equal to or bigger than any minimum time interval to be considered for inactivity of former path provided by the AF, if any (i.e., all active traffic flowing on it ceases to exist for a configurable period of time). According to some embodiments, the AF could send an explicit notification that the former connection is no longer needed.

At step 408, after the Target BP/UL CL and Target UPF (PSA3) have been provisioned (see steps 2-8 in FIG. 4.3.5.7-1 in TS 23.502), the SMF sends event exposure to AF (i.e., a late notification) about the new UP path. If that goes to NEF, then NEF translates it into Nnef_TraffcInfluence_Notify to the AF, as specified in section 4.3.6.3 of TS 23.502. Note that UE traffic can still reach the Old EAS through the Source BP/UL CL and Source UPF (PSA2). This is useful especially while EAS relocation is being completed, and allows the switch to the New EAS to happen when it better suits the application. Operations then continue in FIG. 4B.

Referring now to FIG. 4B, at step 409, context migration between old and New EAS completes. Note that this step may happen any time after step 405, and it may go before steps 406-408.

At step 410, after both steps 408 and 409 are completed, the application client is instructed for when and how to switch to the New EAS, using Application Layer procedures. There may be instructions sent to the application client for how to proceed (e.g., continue to use the Old EAS, send traffic to both, or some other application-specific procedure). Any traffic to the New EAS goes via the Target BP/UL CL and Target UPF (PSA3) as provisioned in step 407. UE application traffic starts to the New EAS on the path through the Target BP/UL CL and Target UPF (PSA3)

At step 411, the SMF removes the Source BP/UL CL and Source UPF (PSA2) after the timer started in step 407 expires.

Figure 5A:
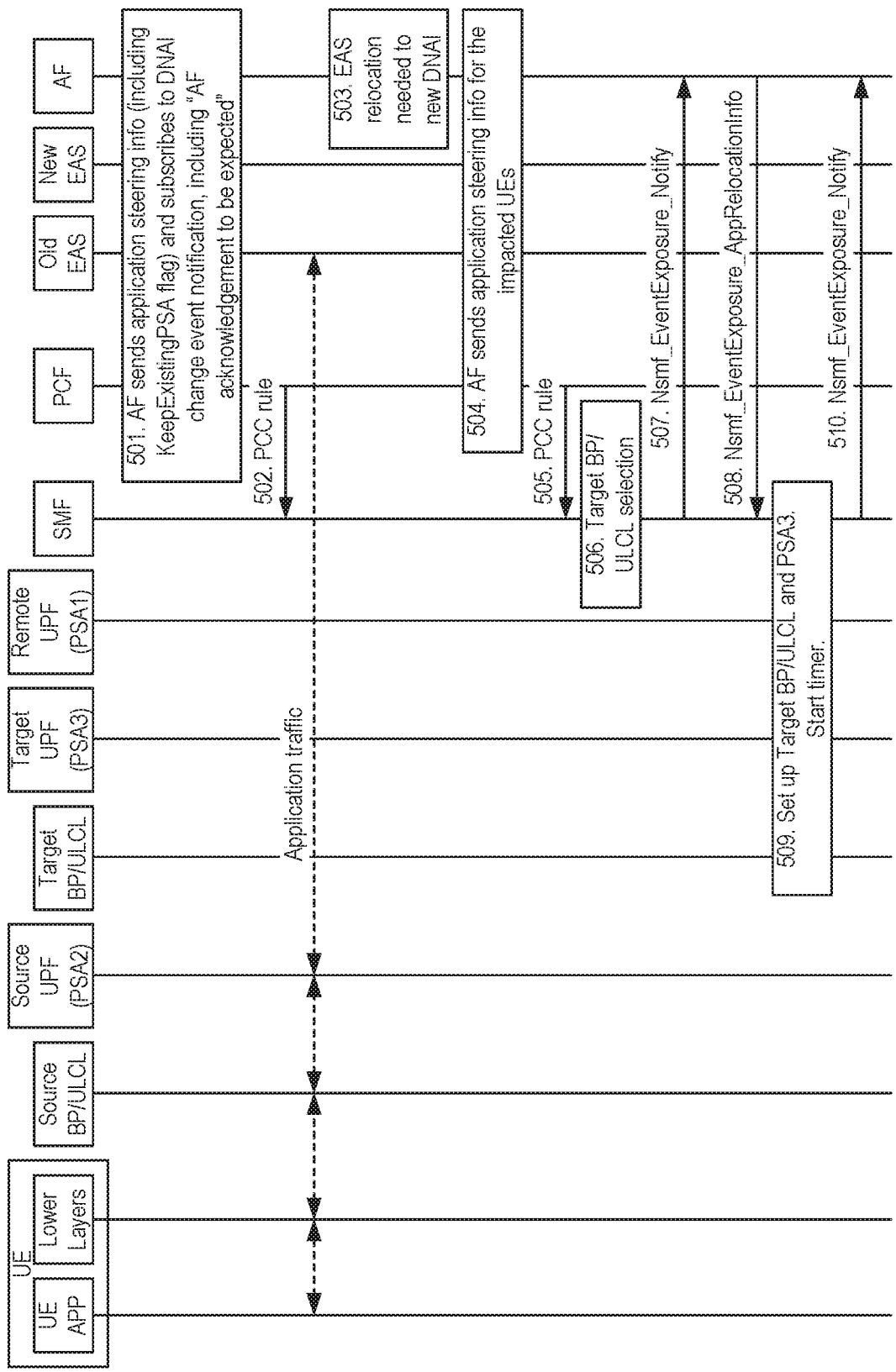
FIGS. 5A and 5B illustrates exemplary communication flows and operations performed when edge relocation is triggered by the application, according to some embodiments disclosed herein.
Figure 5B:
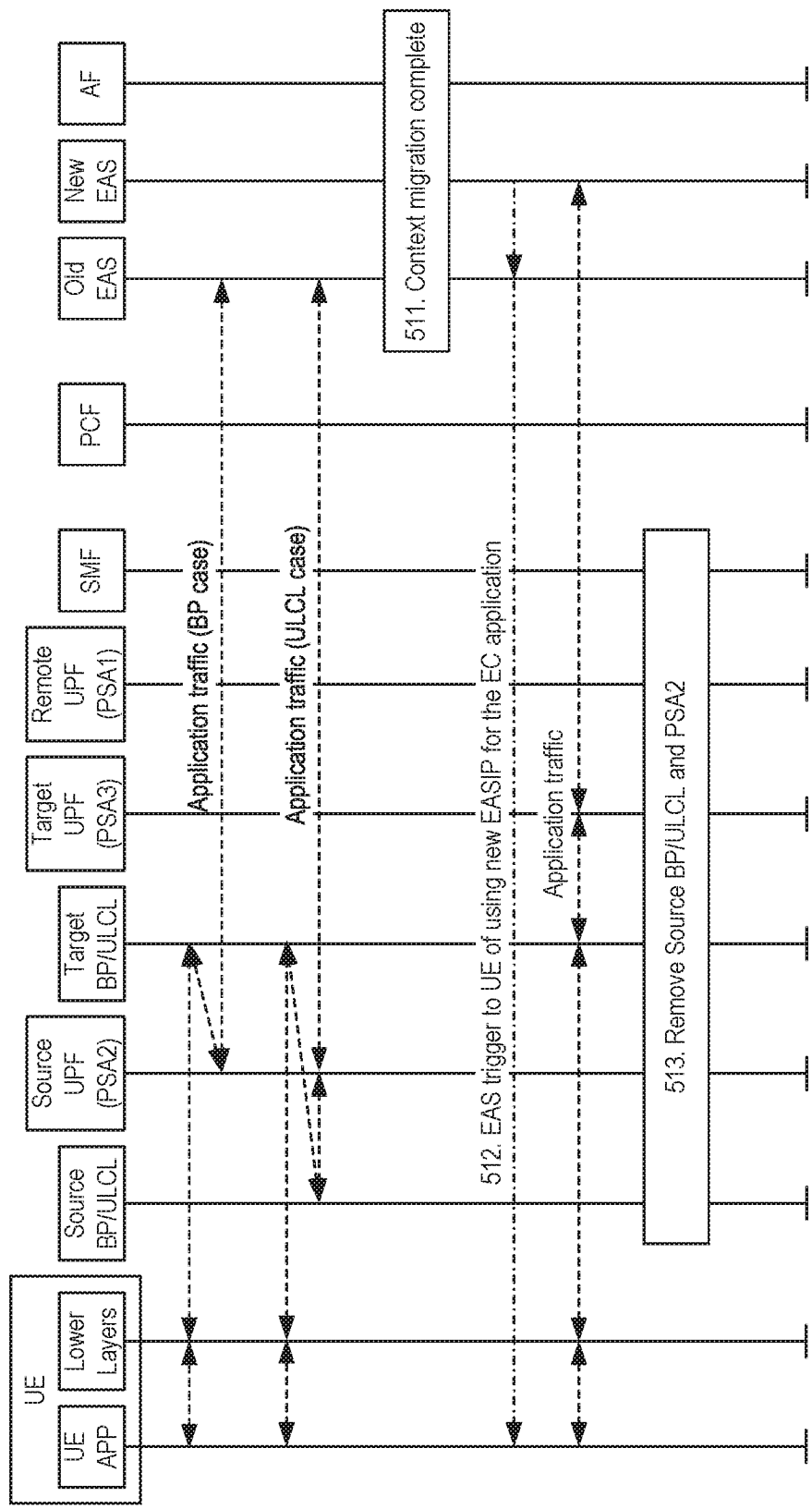

FIGS. 5A and 5B illustrate operations performed when edge relocation is triggered by the application. It is assumed that the AF can get the information of whether EAS relocation is needed based on, for example, a notification from the edge application itself, from the application layer management system, or from some other system. The AF also receives information about the Target DNAI, the UE IP addresses of the ongoing PDU sessions impacted by the EAS relocation, and the target EAS related IP address(es).

When the EAS change does not involve change of DNAI, that can be handled fully by the application layer (e.g., following steps 409, 410, and 411 as in the procedure described above with respect to FIGS. 4A and 4B). When the EAS change involves change of DNAI, that needs to be handled in coordination with the 5GC as described in the following procedure:

In FIG. 5A, steps 501 and 502 are identical to those described above with respect to FIGS. 4A and 4B, and result in application connection to the Old EAS, through the Source BP/UL CL and Source UPF (PSA2).

At step 503, the AF may determine that an EAS change is needed, which requires change of DNAI.

At step 504, the AF invokes the Nnef_TrafficInfluence service separately for each individual UE IP address if influence is done via NEF, or sends an Npcf_PolicyAuthorization Create/Update service request as described in section 4.3.6.4 of TS 23.502, using BSF to locate the PCF for each individual UE. The AF also includes the new keepExistingPSA indication and time information in the message, if not already done in step 501.

In some embodiments, an optimization step can be used to reduce the signaling needs for step 506, since the application-triggered server relocation events may in general involve multiple UEs. In step 506, the AF invokes a Nnef_TrafficInfluence service as described in section 4.3.6.2 of TS 23.502, where the DNAI specifies the Target UE Identifier(s), and traffic descriptors further reduce the scope of the target traffic to be influenced (represented by the combination of DNN and optionally S-NSSAI, and application identifier or traffic filtering information).

At step 505, the PCF then triggers a PCC update to the SMF for the Target DNAI to use for the given PDU session (as in step 503).

At step 506, the PCC change triggers SMF to decide on whether change of PSA is possible and/or convenient, and, if so, it determines the Target UL CL/BP and UPF.

At step 507, the SMF early notification to AF can trigger EAS relocation.

Steps 508-513 are identical to steps 406-411 discussed above with respect to FIGS. 4A and 4B.

Figure 6:
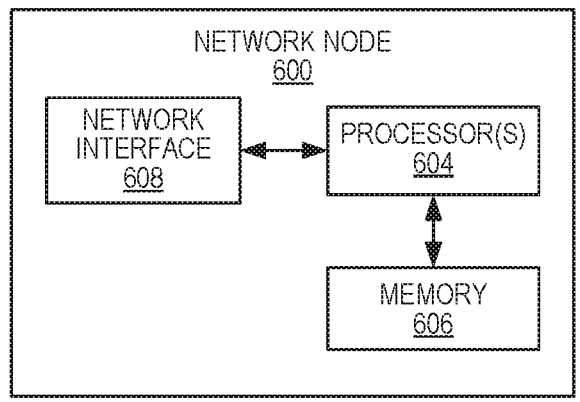
FIG. 6 is a schematic block diagram of a radio access node according to some embodiments of the present disclosure.

FIG. 6 is a schematic block diagram of a network node 600 according to some embodiments of the present disclosure. Optional features are represented by dashed boxes. The network node 600 may be, for example, a network node that implements all or part of the functionality of an NF (e.g., an SMF or PCF) or an AF in accordance with any of the embodiments described herein. As illustrated, the network node 600 includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. The one or more processors 604 operate to provide one or more functions of NF (e.g., SMF or AMF) or AF as described herein. In some embodiments, the function(s) are implemented in software that is stored, e.g., in the memory 606 and executed by the one or more processors 604.

Figure 7:
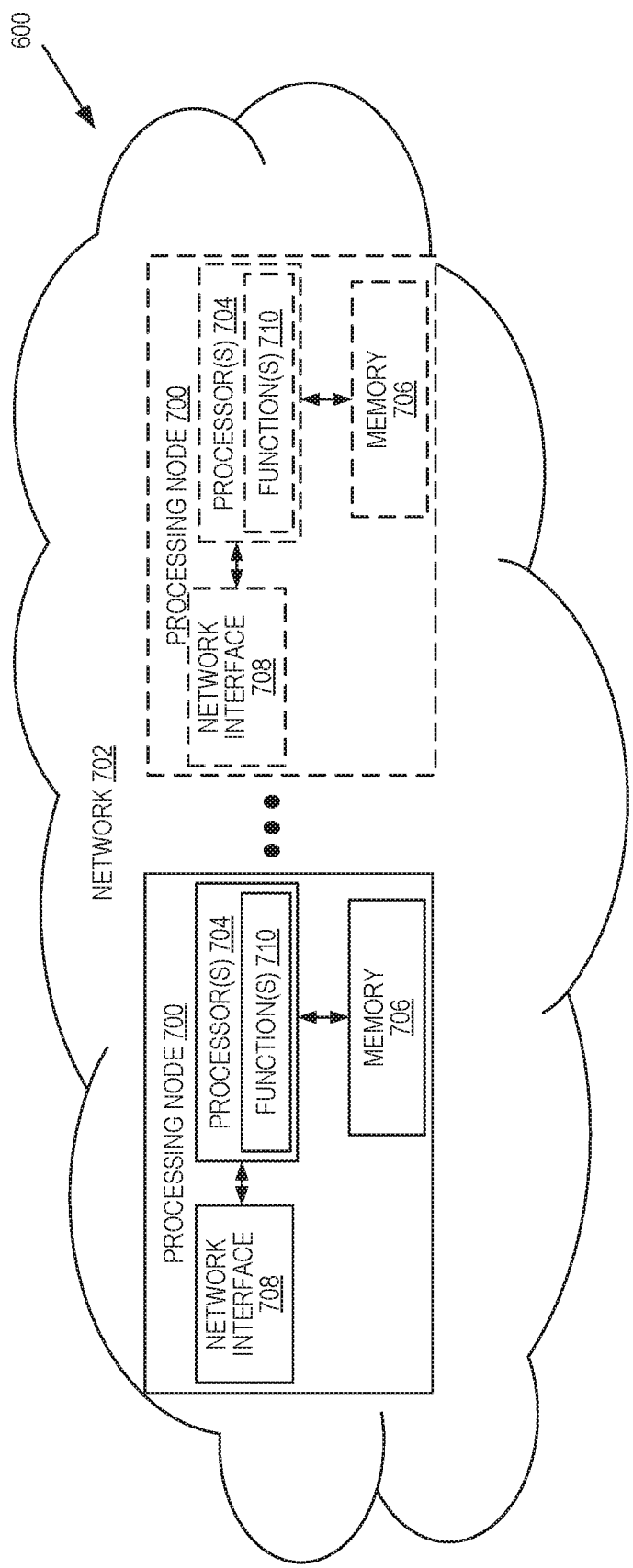
FIG. 7 is a schematic block diagram that illustrates a virtualized embodiment of the radio access node of FIG. 6 according to some embodiments of the present disclosure.

FIG. 7 is a schematic block diagram that illustrates a virtualized embodiment of the network node 600 according to some embodiments of the present disclosure. As used herein, a "virtualized" network node is an implementation of the network node 600 in which at least a portion of the functionality of the network node 600 is implemented as a virtual component(s) (e.g., via a virtual machine(s) executing on a physical processing node(s) in a network(s)). As illustrated, in this example, the network node 600 includes one or more processing nodes 700 coupled to or included as part of a network(s) 702. Each processing node 700 includes one or more processors 704 (e.g., CPUs, ASICs, FPGAs, and/or the like), memory 706, and a network interface 708.

In this example, functions 710 of the network node 600 described herein (e.g., one or more functions of the NF (e.g., SMF or AMF) or AF described herein) are implemented at the one or more processing nodes 700 or distributed across the two or more processing nodes 700 in any desired manner. In some particular embodiments, some or all of the functions 710 of the network node 600 described herein are implemented as virtual components executed by one or more virtual machines implemented in a virtual environment(s) hosted by the processing node(s) 700.

In some embodiments, a computer program including instructions which, when executed by at least one processor, cause the at least one processor to carry out the functionality of the network node 600 or a node (e.g., a processing node 700) implementing one or more of the functions 710 of the network node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
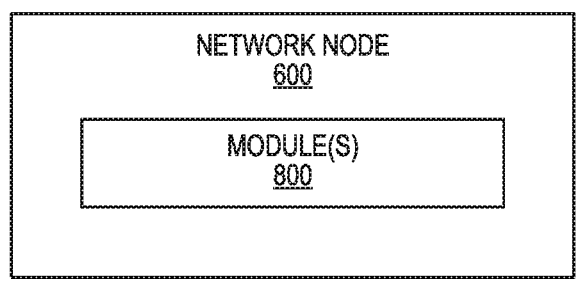
FIG. 8 is a schematic block diagram of the radio access node of FIG. 6 according to some other embodiments of the present disclosure.

FIG. 8 is a schematic block diagram of the network node 600 according to some other embodiments of the present disclosure. The network node 600 includes one or more modules 800, each of which is implemented in software. The module(s) 800 provide the functionality of the network node 600 described herein (e.g., one or more functions of an NF (e.g., SMF or AMF) or AF as described herein). This discussion is equally applicable to the processing node 700 of FIG. 7 where the modules 800 may be implemented at one of the processing nodes 700 or distributed across multiple processing nodes 700.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like.

The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

While not being limited thereto, some example embodiments of the present disclosure are provided below.

Embodiment 1: A method performed in a core network of a cellular communications system to coordinate seamless service continuity at Edge Application Server, EAS, relocation, the method comprising:
at an Application Function, AF:
sending, to a Policy Control Function, PCF, a steering request comprising application steering information comprising a keepExistingPSA indication indicating that a current user plane (UP) path to a current Data Network Access Identifier, DNAI, and to an Edge Application Server, EAS, should be maintained while a new path to a new DNAI and EAS is established;
at the PCF:
receiving the steering request from the AF;
generating Policy and Charging Control, PCC, rules based on the steering request, the PCC rules comprising the application steering information; and
providing the PCC rules to a Session Management Function, SMF; and
at the SMF:
receiving the PCC rules from the PCF;
determining that a simultaneous change of a branching point, BP, or a UL CL, and an additional Protocol Data Unit, PDU, session anchor, PSA, for a PDU session, is to be performed;
determining, based on the keepExistingPSA indication, that session continuity upon UL CL relocation is to be used; and
configuring a target BP or UL CL and a target User Plane Function, UPF.

Embodiment 2: A method performed in an Application Function, AF, in a core network of a cellular communications system to coordinate seamless service continuity at Edge Application Server, EAS, relocation, the method comprising sending, to a Policy Control Function, PCF, a steering request comprising application steering information comprising a keepExistingPSA indication indicating that a current user plane, UP, path to a current Data Network Access Identifier, DNAI, and to an Edge Application Server, EAS, should be maintained while a new path to a new DNAI and EAS is established.

Embodiment 3: The method of embodiment 2, wherein the application steering information further comprises an indication of how long to keep the former Protocol Data Unit, PDU, session anchor, PSA.

Embodiment 4: The method of embodiment 2, wherein the application steering information further comprises an indication of a minimum time interval to be considered for inactivity of a Source branching point, BP/uplink classifier, UL CL, and a Source User Plane Function, UPF.

Embodiment 5: The method of embodiment 2, further comprising:
  determining that an EAS change, requiring a change of DNAI is to be performed; and
  invoking a Nnef_TrafficInfluence service, including the application steering information, where a DNAI specifies one or more target user equipment, UE, identifiers.

Embodiment 6: The method of embodiment 2, further comprising:
  determining that an EAS change, requiring a change of DNAI is to be performed; and
  sending an Npcf_PolicyAuthorization Create service request or an Npcf_PolicyAuthorization Update service request comprising the application steering information.

Embodiment 7: An Application Function, AF, for a core network of a cellular communications system where the AF is enabled to coordinate seamless service continuity at Edge Application Server, EAS, relocation, the AF adapted to send, to a Policy Control Function, PCF, a steering request comprising application steering information comprising a keepExistingPSA indication indicating that a current user plane (UP) path to a current Data Network Access Identifier, DNAI, and to an Edge Application Server, EAS, should be maintained while a new path to a new DNAI and EAS is established.

Embodiment 8: The AF of embodiment 7, wherein the AF is further adapted to perform the method of any one of embodiments 2 to 6.

Embodiment 9: A network node for implementing an Application Function, AF, for a core network of a cellular communications system where the AF is enabled to coordinate seamless service continuity at Edge Application Server, EAS, relocation, the network node comprising:
  a network interface; and
  processing circuitry associated with the network interface, the processing circuitry adapted to cause the network node to implement the AF such that the AF is configured to:
    send, to a Policy Control Function, PCF, a steering request comprising application steering information comprising a keepExistingPSA indication indicating that a current user plane (UP) path to a current Data Network Access Identifier, DNAI, and to an Edge Application Server, EAS, should be maintained while a new path to a new DNAI and EAS is established.

Embodiment 10: The network node of embodiment 9, wherein the AF is further adapted to perform the method of any one of embodiments 2 to 6.

Embodiment 11: A method performed in a Policy Control Function, PCF, in a core network of a cellular communications system to coordinate seamless service continuity at Edge Application Server, EAS, relocation, the method comprising:
  receiving, from an Application Function, AF, a steering request comprising application steering information comprising a keepExistingPSA indication indicating that session continuity is to be maintained upon uplink classifier, UL CL, relocation;
  generating Policy and Charging Control, PCC, rules based on the steering request, the PCC rules comprising the application steering information; and
  providing the PCC rules to a Session Management Function, SMF.

Embodiment 12: The method of embodiment 11, wherein:
  the steering request targets a new PDU session; and
  generating the PCC rules is performed during establishment of the new PDU session.

Embodiment 13: The method of embodiment 11, wherein:
  the steering request targets an ongoing PDU session; and
  generating the PCC rules is performed during modification of the ongoing PDU session.

Embodiment 14: A Policy Control Function, PCF, for a core network of a cellular communications system where the PCF is enabled to coordinate seamless service continuity at Edge Application Server, EAS, relocation, the PCF adapted to:
  receive, from an Application Function, AF, a steering request comprising application steering information comprising a keepExistingPSA indication indicating that session continuity is to be maintained upon uplink classifier, UL CL, relocation;
  generate Policy and Charging Control, PCC, rules based on the steering request, the PCC rules comprising the application steering information; and
  provide the PCC rules to a Session Management Function, SMF.

Embodiment 15: The PCF of embodiment 14, wherein the PCF is further adapted to perform the method of any one of embodiments 12 and 13.

Embodiment 16: A network node for implementing a Policy Control Function, PCF, for a core network of a cellular communications system where the PCF is enabled to coordinate seamless service continuity at Edge Application Server, EAS, relocation, the network node comprising:
  a network interface; and
  processing circuitry associated with the network interface, the processing circuitry adapted to cause the network node to implement the PCF such that the PCF is configured to:
    receive, from an Application Function, AF, a steering request comprising application steering information comprising a keepExistingPSA indication indicating that session continuity is to be maintained upon uplink classifier, UL CL, relocation;
    generate Policy and Charging Control, PCC, rules based on the steering request, the PCC rules comprising the application steering information; and
    provide the PCC rules to a Session Management Function, SMF.

Embodiment 17: The network node of embodiment 16, wherein the AF is further adapted to perform the method of any one of embodiments 12 and 13.

Embodiment 18: A method performed in a Session Management Function, SMF, in a core network of a cellular communications system to coordinate seamless service continuity at Edge Application Server, EAS, relocation, the method comprising:
  receiving Policy and Charging Control, PCC, rules from a Policy Control Function, PCF, the PCC rules comprising application steering information comprising a keepExistingPSA indication indicating that session continuity is to be maintained upon uplink classifier, UL CL, relocation;
  determining that a simultaneous change of a branching point, BP, or a UL CL, and an additional Protocol Data Unit, PDU, session anchor, PSA, for a PDU session, is to be performed;

determining, based on the keepExistingPSA indication, that session continuity upon UL CL relocation is to be used; and configuring a target BP or UL CL and a target User Plane Function, UPF.

Embodiment 19: The method of embodiment 18, wherein:
the application steering information further comprises an indication of how long to keep the former PSA; and
the method further comprises:
starting a timer for a time interval based on the indication of how long to keep the former PSA; and
maintaining a Source BP/UL CL and Source UPF until expiration of the timer.

Embodiment 20: The method of embodiment 18, wherein:
the application steering information further comprises an indication of a minimum time interval to be considered for inactivity of a Source BP/UL CL and a Source UPF; and
the method further comprises:
starting an inactivity timer for traffic through a Source BP/UL CL and a Source UPF, wherein the inactivity timer has a value equal to or larger than the minimum time interval; and
removing the Source BP/UL CL and the Source UPF after a period of inactivity specified by the inactivity timer.

Embodiment 21: A Session Management Function, SMF, for a core network of a cellular communications system where the SMF is enabled to coordinate seamless service continuity at Edge Application Server, EAS, relocation, the SMF adapted to:
receive Policy and Charging Control, PCC, rules from a Policy Control Function, PCF, the PCC rules comprising application steering information comprising a keepExistingPSA indication indicating that session continuity is to be maintained upon uplink classifier, UL CL, relocation;
determine that a simultaneous change of a branching point, BP, or a UL CL, and an additional Protocol Data Unit, PDU, session anchor, PSA, for a PDU session, is to be performed;
determine, based on the keepExistingPSA indication, that session continuity upon UL CL relocation is to be used; and
configure a target BP or UL CL and a target UPF.

Embodiment 22: The SMF of embodiment 21, wherein the SMF is further adapted to perform the method of any one of embodiments 19 and 20.

Embodiment 23: A network node for implementing a Session Management Function, SMF, for a core network of a cellular communications system where the SMF is enabled to coordinate seamless service continuity at Edge Application Server, EAS, relocation, the network node comprising:
a network interface; and
processing circuitry associated with the network interface, the processing circuitry adapted to cause the network node to implement the SMF such that the SMF is configured to:
receive, from an Application Function, AF, a steering request comprising application steering information comprising a keepExistingPSA indication indicating that session continuity is to be maintained upon uplink classifier, UL CL, relocation;
generate Policy and Charging Control, PCC, rules based on the steering request, the PCC rules comprising the application steering information; and
provide the PCC rules to a Session Management Function, SMF.

Embodiment 24: The network node of embodiment 23, wherein the AF is further adapted to perform the method of any one of embodiments 19 and 20.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method for coordinating seamless service continuity to Edge Application Server, EAS, at relocation in a cellular communications system, the method comprising:
at an Application Function, AF, sending, to a Policy Control Function, PCF, a steering request comprising application steering information that comprises a keepExistingPSA indication that indicates that a current user plane, UP, path to a current Data Network Access Identifier, DNAI, and to an EAS should be maintained while a new path to a new DNAI and EAS is established;

at the PCF:
receiving the steering request from the AF;
generating Policy and Charging Control, PCC, rules based on the steering request, wherein the PCC rules comprise the application steering information comprising the keepExistingPSA indication; and
providing the PCC rules to a Session Management Function, SMF; and at the SMF:
receiving the PCC rules from the PCF;
determining that a change of Protocol Data Unit, PDU, session anchor, PSA, for a PDU session, is to be performed from the source PSA to a target PSA;
determining, based on the keepExistingPSA indication, that simultaneous connectivity over the source PSA and the target PSA is to be provided; and
configuring the target PSA while maintaining the UP connectivity over the source PSA to the current Data Network Access Identifier, DNAI, and to the EAS.

2. A method for coordinating seamless service continuity to Edge Application Server, EAS, at relocation in a cellular communications system, the method comprising sending, by an Application Function, AF, to a Policy Control Function, PCF, a steering request comprising application steering information that comprises a keepExistingPSA indication that indicates that a current user plane, UP, path to a current Data Network Access Identifier, DNAI, and to an Edge Application Server, EAS, should be maintained while a new path to a new DNAI and EAS is established.

3. The method of claim 2, wherein the application steering information further comprises a KeepExistingPSATimer indication that indicates how long to keep a former Protocol Data Unit, PDU, session anchor, PSA.

4. The method of claim 2, wherein the application steering information further comprises an indication of a minimum time interval to be considered for inactivity of a Source branching point, BP/uplink classifier, UL CL.

5. The method of claim 2, wherein the application steering information further comprises an indication of a minimum time interval to be considered for inactivity of a Source User Plane Function, UPF.

6. The method of claim 2, further comprising:
determining that an EAS change requiring a change of DNAI is to be performed; and
invoking a Nnef_TrafficInfluence service, including the application steering information.

7. The method of claim 2, further comprising:
determining that an EAS change requiring a change of DNAI is to be performed; and
sending one of an Npcf_PolicyAuthorization Create service request comprising the application steering information and an Npcf_PolicyAuthorization Update service request comprising the application steering information.

8. A network node for implementing an Application Function, AF, where the AF is enabled to seamless service continuity to Edge Application Server, EAS, at relocation in a cellular communications system, the network node comprising:
a network interface; and
processing circuitry associated with the network interface, the processing circuitry configured to send, to a Policy Control Function, PCF, a steering request comprising application steering information that comprises a keepExistingPSA indication that indicates that a current user plane, UP, path to a current Data Network Access Identifier, DNAI, and to an Edge Application Server, EAS, should be maintained while a new path to a new DNAI and EAS is established.

9. The network node of claim 8, wherein the application steering information further comprises a KeepExistingPSA-Timer indication that indicates how long to keep a former Protocol Data Unit, PDU, session anchor, PSA.

10. The network node of claim 8, wherein the application steering information further comprises an indication of a minimum time interval to be considered for inactivity of a Source branching point, BP/uplink classifier, UL CL.

11. The network node of claim 8, wherein the application steering information further comprises an indication of a minimum time interval to be considered for inactivity of a Source User Plane Function, UPF.

12. The network node of claim 8, wherein the processing circuitry is further configured to:
determine that an EAS change requiring a change of DNAI is to be performed; and
invoke a Nnef_TrafficInfluence service, including the application steering information.

13. The network node of claim 8, wherein the processing circuitry is further configured to:
determine that an EAS change requiring a change of DNAI is to be performed; and
send one of an Npcf_PolicyAuthorization Create service request comprising the application steering information and an Npcf_PolicyAuthorization Update service request comprising the application steering information.

14. A network node for implementing a Policy Control Function, PCF, for a core network of a cellular communications system where the PCF is enabled to coordinate seamless service continuity to Edge Application Server, EAS, at relocation, the network node comprising:
a network interface; and
processing circuitry associated with the network interface, the processing circuitry configured to:
receive, from an Application Function, AF, a steering request that comprises application steering information that comprises a keepExistingPSA indication that indicates that a current user plane, UP, path to a current Data Network Access Identifier, DNAI, and to an Edge Application Server, EAS, should be maintained while a new path to a new DNAI and EAS is established;
generate Policy and Charging Control, PCC, rules based on the steering request, wherein the PCC rules comprise the application steering information; and
provide the PCC rules to a Session Management Function, SMF.

15. The network node of claim 14, wherein the steering request targets a new Protocol Date Unit, PDU, session; and that the generation of the PCC rules is done during establishment of the new PDU session.

16. A method performed in a Session Management Function, SMF, in a core network of a cellular communications system to coordinate seamless service continuity to Edge Application Server, EAS, at relocation, the method comprising:
receiving Policy and Charging Control, PCC, rules from a Policy Control Function, PCF, wherein the PCC rules comprise application steering information that comprises a keepExistingPSA indication that indicates that a current user plane, UP, path to a current Data Network Access Identifier, DNAI, and to an Edge Application Server, EAS, should be maintained while a new path to a new DNAI and EAS is established;

determining that a change of Protocol Data Unit, PDU, session anchor, PSA, for a PDU session, is to be performed from a source PSA to a target PSA;

determining, based on the keepExistingPSA indication, that simultaneous connectivity over the source PSA and the target PSA is to be provided; and configuring the target PSA while maintaining user plane, UP, connectivity over the source PSA to the current Data Network Access Identifier, DNAI, and to the EAS.

17. The method of claim 16, wherein:

the application steering information further comprises a KeepExistingPSATimer indication that indicates how long to keep a former Protocol Data Unit, PDU, session anchor, PSA; and the method further comprises:
  starting a timer for a time interval based on the indication of how long to keep the former PSA; and
  maintaining a Source BP/UL CL and a Source UPF until expiration of the timer.

18. The method of claim 16, wherein:

the application steering information further comprises an indication of a minimum time interval to be considered for inactivity of a Source BP/UL CL and a Source UPF; and the method further comprises:
  starting an inactivity timer for traffic through the Source BP/UL CL and the Source UPF, wherein the inactivity timer has a value equal to or larger than the minimum time interval; and
  removing the Source BP/UL CL and the Source UPF after a period of inactivity specified by the inactivity timer.

19. A network node for implementing a Session Management Function, SMF, for a core network of a cellular communications system where the SMF is enabled to coordinate seamless service continuity at Edge Application Server, EAS, relocation, the network node comprising:

a network interface; and processing circuitry associated with the network interface, the processing circuitry configured to:

receive Policy and Charging Control, PCC, rules from a Policy Control Function, PCF, wherein the PCC rules comprise application steering information that comprises a keepExistingPSA indication that indicates that a current user plane, UP, path to a current Data Network Access Identifier, DNAI, and to an Edge Application Server, EAS, should be maintained while a new path to a new DNAI and EAS is established;

determine that a change of Protocol Data Unit, PDU, session anchor, PSA, for a PDU session, is to be performed from a source PSA to a target PSA;

determine, based on the keepExistingPSA indication, that simultaneous connectivity over the source PSA and the target PSA is to be provided; and configure the target PSA while maintaining user plane, UP, connectivity over the source PSA to the current Data Network Access Identifier, DNAI, and to the EAS.

20. The network node of claim 19, wherein:

the application steering information further comprises a KeepExistingPSATimer indication that indicates how long to keep a former Protocol Data Unit, PDU, session anchor, PSA; and the processing circuitry is further configured to:
  start a timer for a time interval based on the indication of how long to keep the former PSA; and
  maintain a Source BP/UL CL and a Source UPF until expiration of the timer.

21. The network node of claim 19, wherein:

the application steering information further comprises an indication of a minimum time interval to be considered for inactivity of a Source BP/UL CL and a Source UPF; and the processing circuitry is further configured to:
  start an inactivity timer for traffic through the Source BP/UL CL and the Source UPF, wherein the inactivity timer has a value equal to or larger than the minimum time interval; and
  remove the Source BP/UL CL and the Source UPF after a period of inactivity specified by the inactivity timer.

* * * * *